United States Patent Office 3,101,011
Patented Aug. 20, 1963

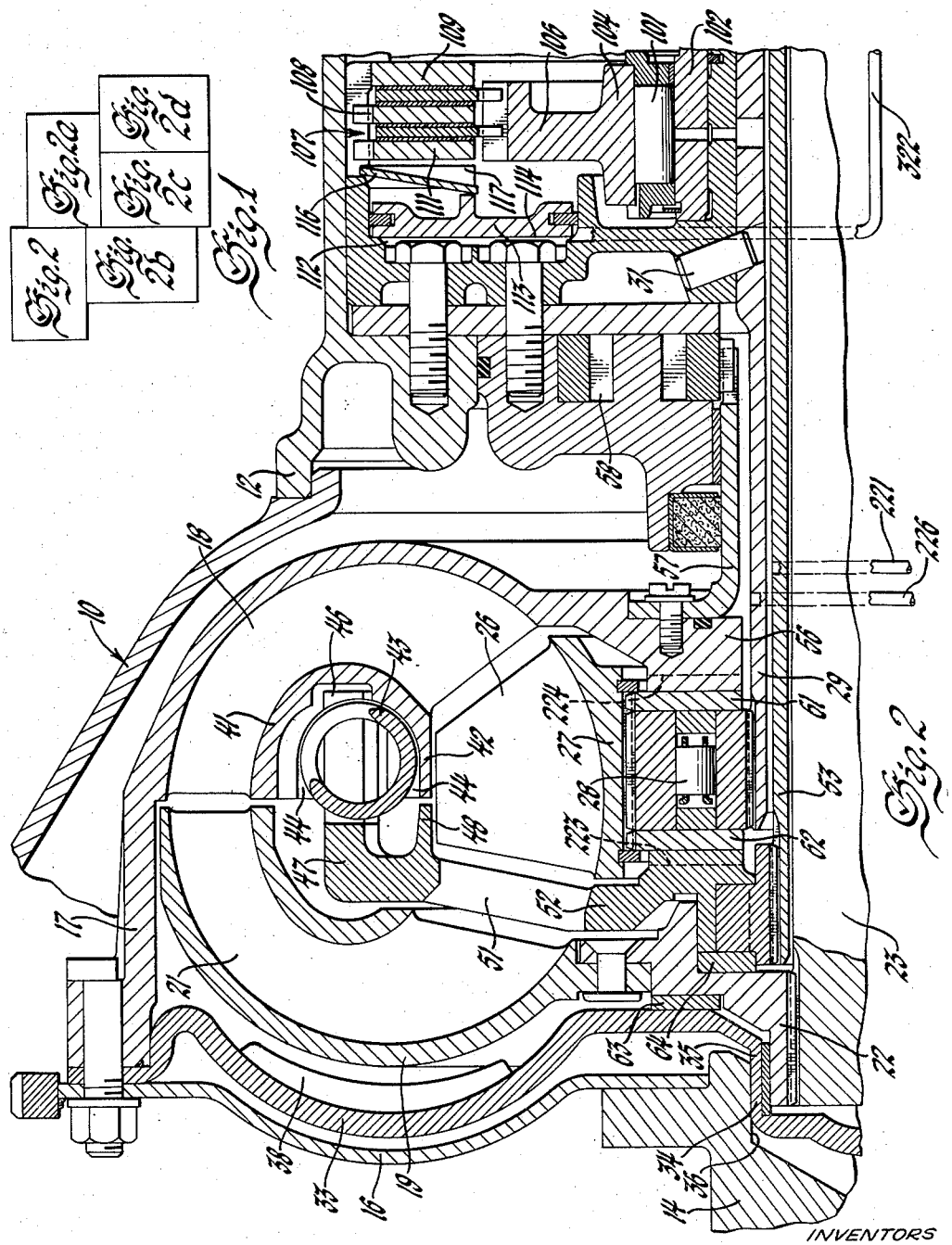
Aug. 20, 1963 — R. M. TUCK ETAL — 3,101,011
TRANSMISSION
Filed Nov. 25, 1957 — 5 Sheets-Sheet 1
INVENTORS
Mark E. Fisher,
James J. Mooney, Jr. &
Robert M. Tuck
BY W. C. Middleton
ATTORNEY

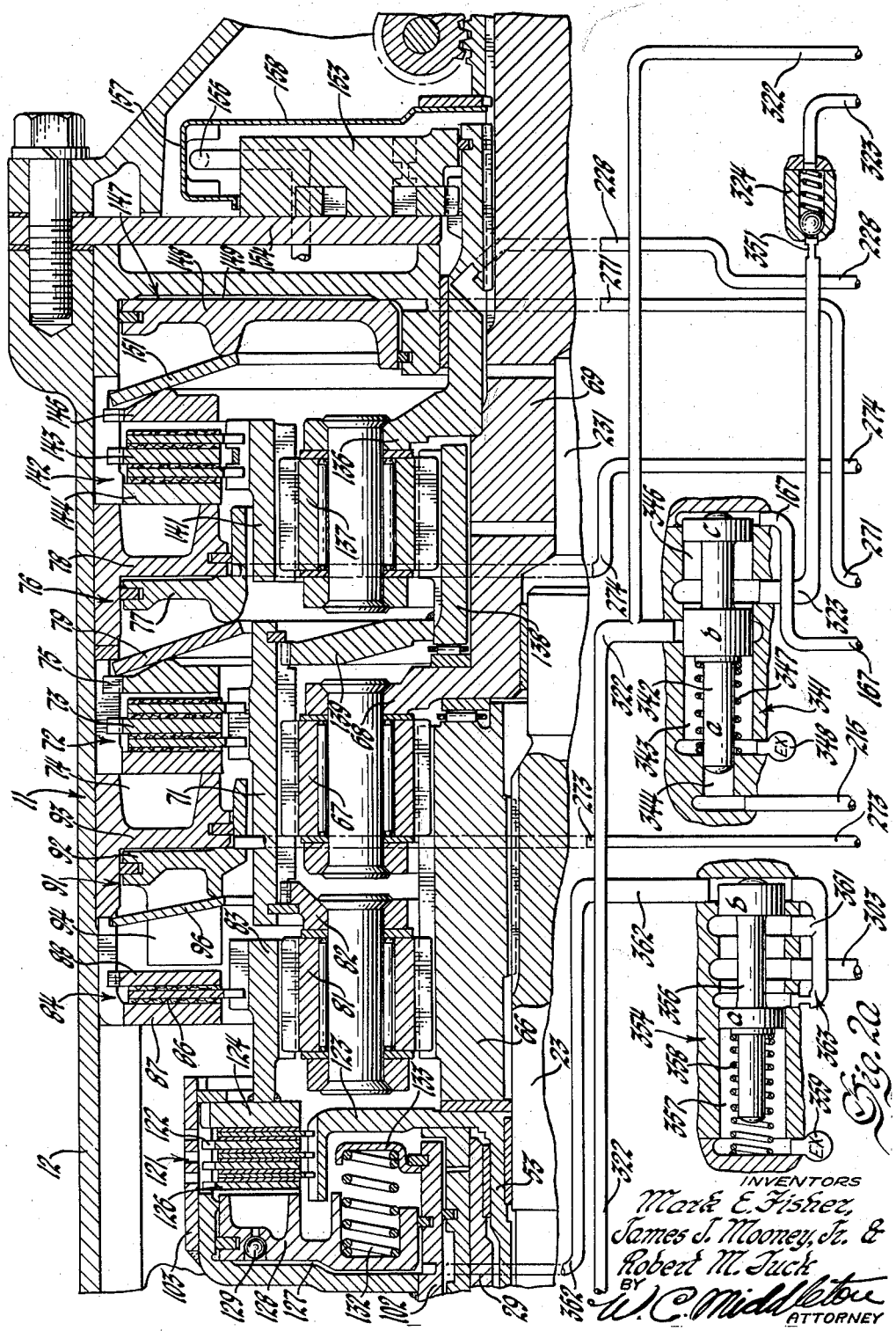

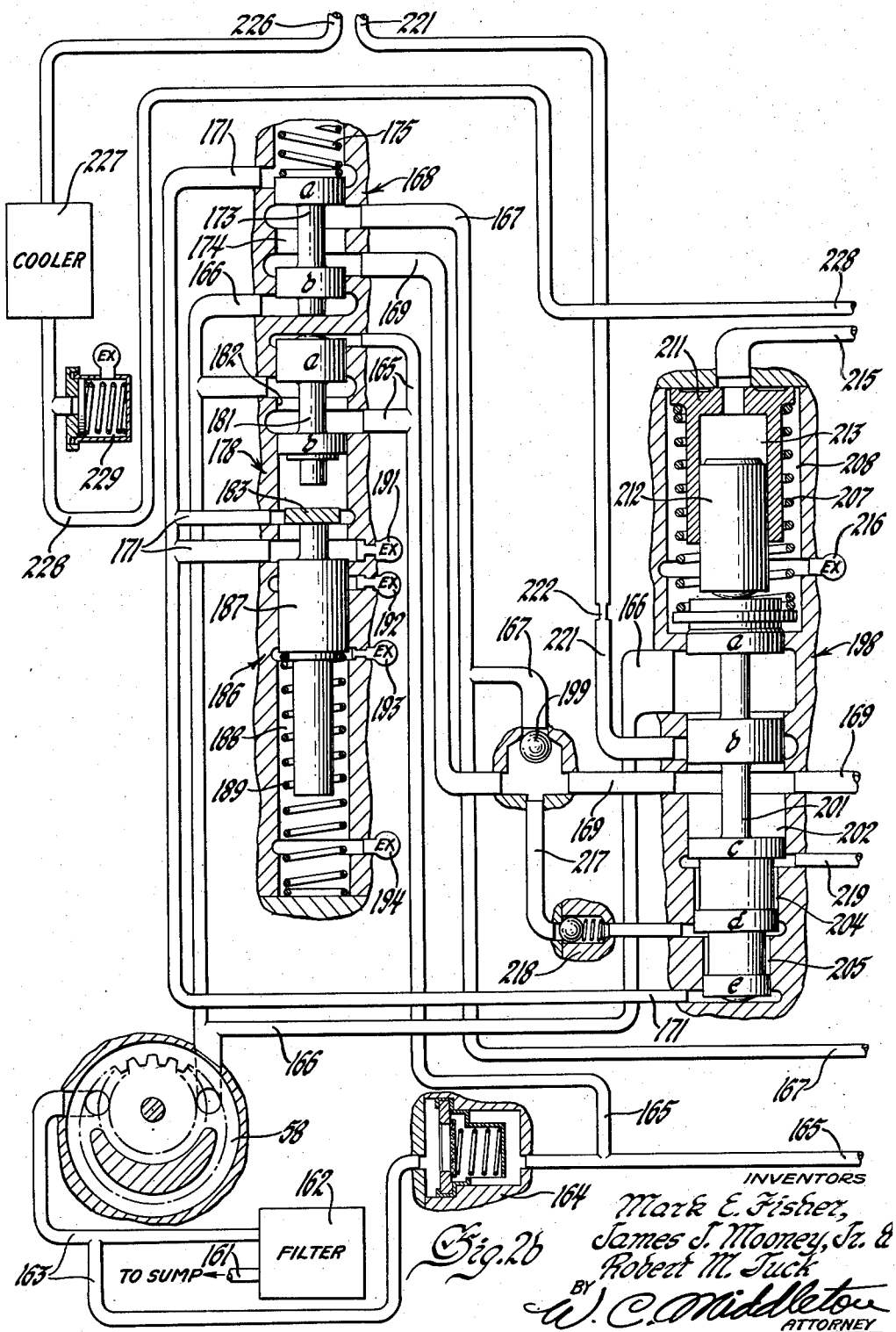

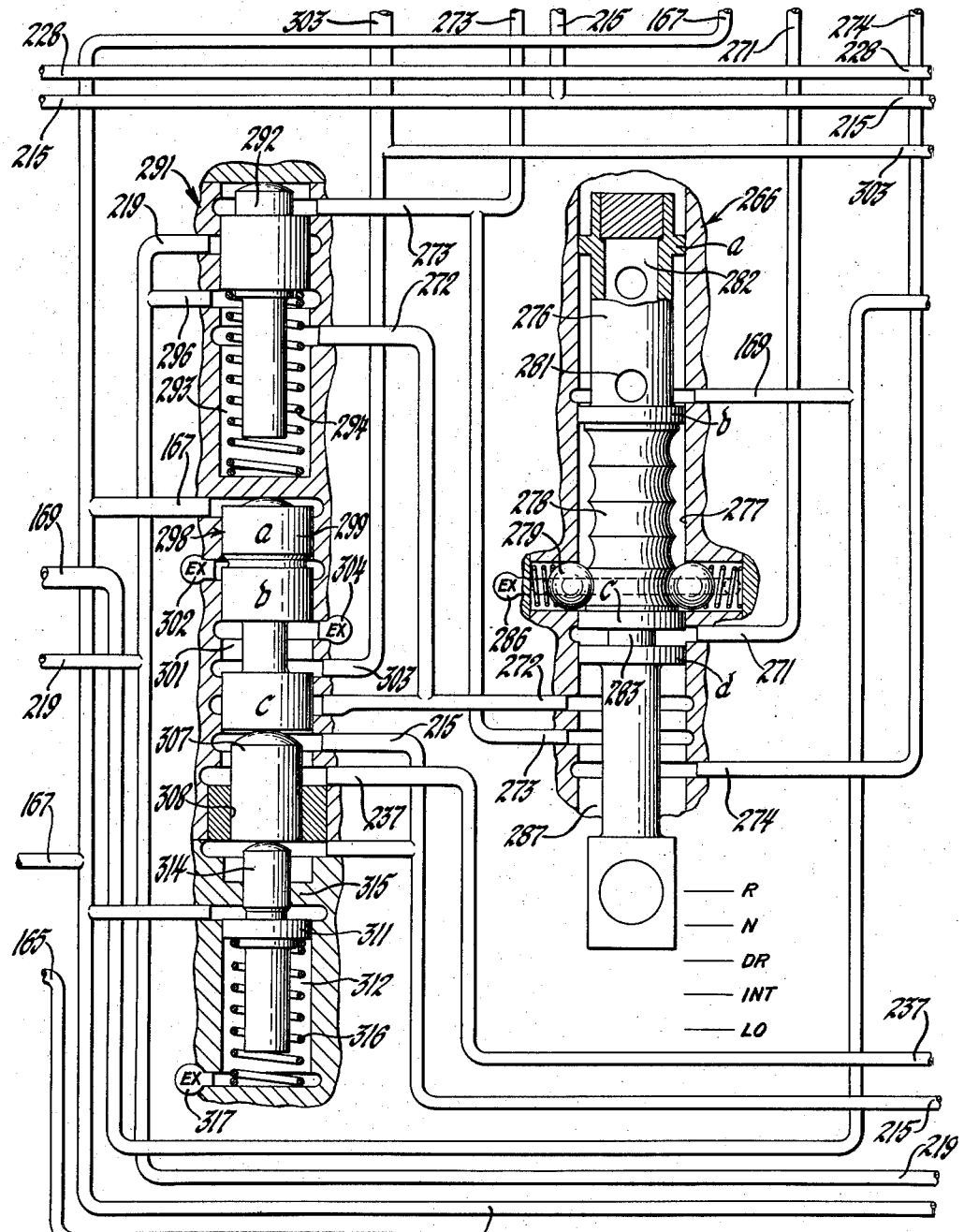

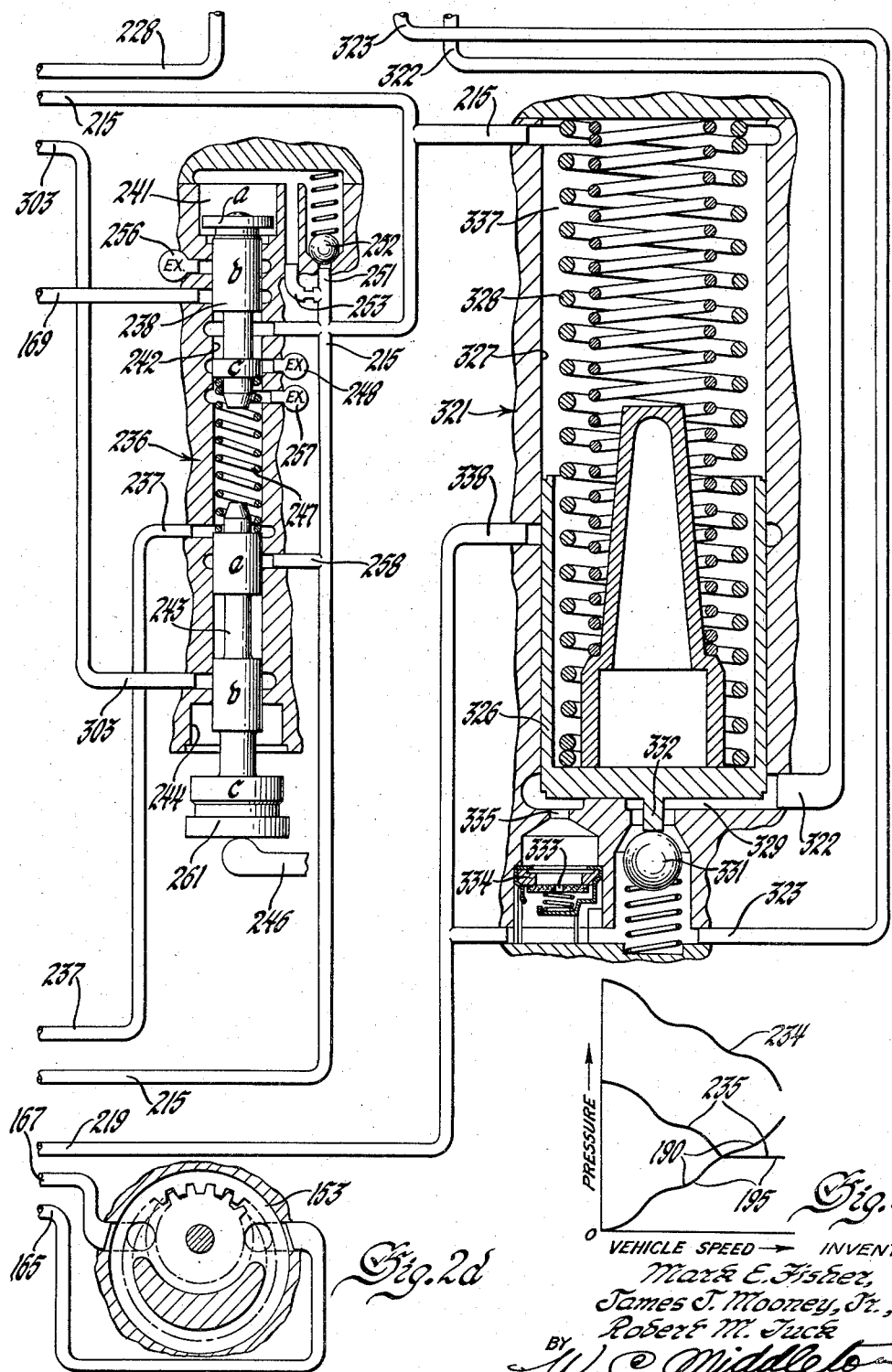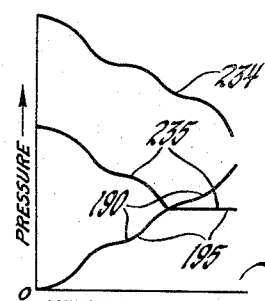

3,101,011
TRANSMISSION
Robert M. Tuck and James J. Mooney, Jr., Indianapolis, and Mark E. Fisher, Carmel, Ind., assignors to General Motors Corporation, Detroit, Mich., a corporation of Delaware
Filed Nov. 25, 1957, Ser. No. 698,620
30 Claims. (Cl. 74—732)

This invention relates to a multiratio transmission and more particularly a transmission having a torque converter, a multiratio gear unit and automatic controls.

The transmission employs a torque converter and a multiratio gear set providing three forward ratios and reverse connected in series. The multiratio gear unit is preferably of the planetary type having a dual sun gear input and a dual carrier output. Low ratio is provided by holding the first ring gear. Intermediate ratio may be provided by directly holding a second ring gear of this compound planetary gear set for a direct drive or by holding the second ring gear through a one-way clutch for a free wheel drive. A third ratio split torque drive is provided when the input is connected through a damping device located in the eye of the torque converter and a clutch to the second ring gear to provide one torque path, in combination with normal input drive through the torque converter to the sun gears to provide another torque path. Reverse is obtained by holding the ring gear of the reverse gear set.

The hydraulic control system is conditioned for operation in low, intermediate and drive ranges, neutral and reverse range by a manual selector valve. In the reverse, low and intermediate ranges the manual selector valve directly controls the hydraulic control system to engage respectively the reverse, first and positive intermediate gear ratios which in combination with the torque converter drive provide variable ratio drives in each of these ranges. In intermediate range the second ring gear is positively held to provide a two-way drive for down-hill braking without any speed-responsive upshift to a higher ratio. In this ratio the one-way retarding device which holds the second ring gear is also engaged but is effective only when the positive retarding device slips or is disengaged, i.e., on a shift to drive range, and the freewheeling drive in intermediate ratio, the lower ratio of drive range, is established. When the speed increases to the upshift point for the throttle setting the shift valve upshifts to engage the clutch connecting the input to the ring gear of a second planetary gear set to provide a split torque drive which in the converter coupling range is substantially a direct drive. The governor pressure to operate the shift valve is provided by a rear pump whose output is controlled by a multiple orifice governor valve to provide a stepped governor curve. The input of the rear pump is supplied during normal operation from the front pump at a pressure the same as or proportionate to the rear pump output pressure so that the rear pump supplies a volume of fluid proportional to the speed of the pump in order to provide an accurate governor pressure. The high clutch line is connected through an accumulator to provide a controlled pressure increase regulated in accordance with throttle pedal position for soft clutch engagement. The disengagement of the one-way retarding device which occurs on a shift from intermediate to low range is controlled by an exhaust control valve responsive to throttle pressure and governor pressure to provide a faster exhaust at higher speeds and particularly under low throttle conditions. The high clutch supply is controlled by a timing valve which provides an initial fast pressure rise to fill the fluid motor and thereafter a slow pressure rise for soft engagement of the clutch.

Another object of the invention is to provide in an automatic transmission having a hydraulic control system in which fluid is supplied to a ratio change fluid motor, an accumulator connected to the fluid motor having the rate of fill of the accumulator controlled by the torque demand on the engine and the volume of fluid in the accumulator or the pressure in said fluid motor.

Another object of the invention is to provide in an automatic transmission having a hydraulic control system in which a source of fluid under pressure is connected to a ratio change fluid motor, an accumulator connected to the supply line and controlling valving in the supply line to provide flow at a high rate during an initial portion of the pressure rise to provide flow at a low rate during a second portion of the pressure rise and to provide flow at a high rate in a third portion of the pressure rise.

Another object of the invention is to provide in an automatic transmission having a source of pressure connected to a ratio change fluid motor, a valving arrangement to provide for the supply of fluids to the fluid motor at one rate and the exhaust fluid at a different rate under certain conditions of torque demand on the engine and transmission speed.

Another object of the invention is to provide in an automatic transmission having a source of fluid connected to a ratio change fluid motor, means to supply fluid to the fluid motor at one rate and to exhaust fluid from the motor at a different rate under low speed conditions and at a third rate under certain high speed conditions.

These and other objects of the invention will be more apparent from the following description and drawings showing a preferred embodiment of the invention.

FIGURES 2, 2a, 2b, 2c and 2d, when arranged as shown in FIGURE 1, comprise the schematic layout showing the transmission torque converter gearing and the hydraulic controls therefor.

FIGURE 3 shows the governor and main line pressure curves.

The transmission comprises a torque converter unit 10 and a three ratio and reverse gear unit 11 mounted in a housing 12. The input or engine shaft 14 is connected by a flex plate 16 which is dished to permit relative axial movement between the engine shaft and the torque converter housing 17. The torque converter housing carries the impeller blades 18 which pump fluid around the torus chamber to the turbine member 19 where the fluid acts on the turbine blades 21 to drive the turbine member which is connected through the hub 22 to drive the torque converter output or intermediate shaft 23. The fluid circulating around the converter torus is then redirected by the stator blades 26 which are mounted on a hub 27 connected by the one-way clutch device 28 to the ground sleeve 29 secured by pin 31 to the housing 12. The forward wall 33 of the toque converter housing 17 has a central pilot bearing portion 34 fitting into a bore 36 in the end of the shaft 14 to rotatably support the converter housing. A bearing 35 is mounted within the bearing portion to rotatably support the turbine hub 22 and the shaft 23. These plain bearings permit converter housing 17 and pilot bearing 34 and the hub 22 to slide axially with respect to each other and engine shaft 14. The forward wall of the toque converter housing 33 has a plurality of radial fins 38 which pump fluid radially outwardly in the same manner as the impeller blades 18 to balance the pressures on both sides of the turbine member 19 to reduce the axial thrust.

The torque converter housing 17 has an inner shell portion 41 attached to the impeller blades 18 which provides a positive drive for the split torque drive. The shell 41 has a portion 42 extending over the stator blades 26 to provide an inner shell for the stator blade and to provide a semi-circular recess to receive a plurality of damper springs 43. Each pair of springs is located between a pair of abutment portions 44 on the shell 41 with a tongue 46 located between each pair of springs. The tongues 46 are mounted on a hub 47 which has a portion 48 forming the remainder of the inner shell above the stator, a strut portion 51 connected across the torque converter torus chamber having a cross section to provide the least interference with the flow of the fluid, and an inner hub portion 52 splined to the sleeve shaft 53, which as described below provides the connection between the input member and the gearing for the split torque drive. The torque converter housing 17 extends inwardly to the hub 56 which is connected to drive the input pump 58 by a sleeve 57 and suitable splines permitting relative axial movement of housing 17.

The elements of the torque converter are axially located by a thrust washer 61 located between the hub 56 and the one-way clutch 28, a thrust washer 62 located between the one-way clutch and the hub 52, a thrust washer 63 between the turbine hub 22 and the front wall 33, and thrust surfaces 64 on the hub 52 and hub 22. The hubs 22 and 52 and the free wheeler 28 are respectively slidably mounted on the shafts 23, 53 and ground sleeve 29. Thus, the parts of the converter are normally located in the position shown and expansion of the converter housing is permitted in either direction.

GEARING

The torque converter output shaft 23 drives the low and intermediate sun gear 66 which meshes with the low planetary pinions 67 mounted on a carrier 68 on the output shaft 69. Planetary pinions 67 mesh with ring gear 71 whose rotation is retarded and stopped to effect low ratio drive by a ratio engaging connecting device 72 which in this instance is a gear reaction brake. The ratio engaging device 72 consists of a plurality of plates 73 located between a fixed abutment 74 formed as a portion of the housing 12 and a movable abutment 75 splined to the housing 12 with alternate plates splined to ring gear 71 and intermediate plates splined to the housing 12. A fluid motor 76 consisting of an L-shaped annular piston 77 mounted on an L-shaped cylinder 78 engages the inner edge of an annular spring lever 79 to swing the annular lever about its outer edge which is pivoted to the housing 12 so that an intermediate portion engages the movable abutment 75 to apply the ratio engaging device 72.

The sun gear 66 also has a portion which may be of the same diameter meshing with the pinions 81 mounted on the intermediate carrier 82 which is secured by suitable splines to the ring gear 71. Pinions 81 also mesh with the intermediate ring gear 83 which may be retarded by the ratio engaging connecting device 84 which in this case is a gear reaction brake. This device since the reaction is less than the reaction on the low ratio ring gear 71 may consist of one rotatable plate 86 splined to the ring gear 83, the fixed abutment 87 formed as a portion of the housing 12 and a movable abutment 88 splined to the housing 12. The intermediate ratio engaging device 84 is actuated by a fluid motor 91 having an L-shaped annular piston 92 mounted on a similar cylinder 93. The piston 92 has a plurality of thrust portions 94 engaging the movable plate 88. The annular spring lever 96 which is pivoted at its outer edge to the housing 12 has a plurality of fingers extending between the thrust portions to retract the piston.

The intermediate ratio may also be established through a one-way clutch 101 which has an inner race sleeve 102 connected by a clutch housing 103 splined to abutment 124 welded to the ring gear 83. The one-way clutch has an outer race 104 formed as a portion of the hub 106 which may be retarded by a ratio engaging connecting device 107 which consists of a plurality of plates 108 with alternate plates splined to the hub 106 and intermediate plates splined to the housing 12 located between the fixed abutment 109 on the housing 12 and an axially movable abutment 111 splined to the housing 12. The ratio engaging connecting device 107 is actuated by a fluid motor 112 consisting of a piston 113 located in the cylinder 114 formed in housing 12. The piston 113 engages the inner edge of a slotted annular retraction spring having its outer edge anchored to the housing 112. Thrust portions 117 on the piston 113 extend through slots in the annular spring 116 to engage the end plate 111.

The split torque drive in high ratio is provided by connecting the input driven shaft 53 by a ratio engaging connecting device or ratio clutch 121 to a ring gear 83. The ratio engaging device 121 has a plurality of plates 122 with alternate plates connected to the housing 103 and thus ring gear 83 and intermediate plates connected to a hub 123 formed on or connected to the input driven shaft 53. The plates are located between the abutment 124 fixed to the housing 103 and the movable abutment 126 splined to the housing 103. The housing 103 and the extension of inner race sleeve 102 cooperate to provide a cylinder 127 for the piston 128 which engages the movable plate 126. A centrifugal type vent valve 129 opens while pressure is being reduced in the piston 128 due to centrifugal force to more rapidly vent the cylinder 127. A retraction spring 132 located between the piston 128 and the abutment portion 133 on sleeve 102 retracts the piston.

Reverse ratio is provided by a reverse gear set which includes a carrier 136 splined to the output shaft 69 and having a plurality of planetary pinions 137 meshing with a sun gear 138 connected by a hub 139 to the ring gear 71 and carrier 82 and also meshing with a reverse ring gear 141 which may be held by the ratio engaging connecting device 142 to establish reverse ratio. The ratio drive engaging device 142 consists of a plurality of plates 143 with alternate plates splined to the ring gear 141 and intermediate plates splined to the housing 12 located between a fixed abutment 144 on the housing 12 and a movable abutment 146 splined to the housing 12. This drive device 143 is actuated by a fluid motor 147 consisting of a piston 148 located in a cylinder 149 formed in the housing 12. The piston 148 engages the inner edge of an annular spring lever 151 which is pivoted at its outer edge to the housing 12 and has an intermediate portion engaging the movable plate 146.

The rear pump 153 is supported on the rear wall 154 of the housing 12. The pump 153 may also support the Pitot tube 156 located in the Pitot can 157 which is full of fluid and rotatably mounted by hub 158 on the output shaft 69. This Pitot governor assembly may be used to provide a governor pressure from Pitot tube 156 for the control system by replacing governor line 167 for any accessory.

The low ratio engaging device 72 is engaged to hold the ring gear 71 and effect a low ratio drive through the torque converter driven shaft 23 to drive the output shaft 69 at a reduced gear ratio. In intermediate ratio the ring gear 83 is held either positively by ratio engaging device 84 or through the one-way clutch 101 to provide a freewheeling drive when only the ratio engaging device 107 is employed. When the ring gear 83 is held the drive is through the torque converter to the torque converter output shaft 23 and sun gear 66 which rotates the planetary carrier 82 and ring gear 71 at an intermediate speed so that sun gear 66 driving the pinions 67 and carrier 68 in conjunction with a moving ring gear 71 rotates the output shaft 69 at an intermediate speed.

High ratio drive is a split torque drive with part of the power or torque flow passing through the torque converter by the action of the impeller blades 18 and the turbine blades 21 to the converter output shaft 23 and part of the power passing by direct mechanical connection from the input shaft 14, converter housing 17 and the damping device located in the eye of the torque converter housing to the direct drive shaft 53. The torque converter output shaft 23 drives the sun gear 66, and the direct drive shaft 53, when the ratio engaging device 121 is engaged, drives the ring gear 83 to provide a split torque drive substantially at 1 to 1 ratio when the converter is operating in the coupling range.

Hydraulic Control System

The hydraulic control system is manually controlled to select neutral, low, intermediate, drive or reverse ranges of operation. In neutral all the ratio engaging devices are disengaged so that torque cannot be transmitted to the output. In low range a low gear ratio is engaged by the ratio engaging device 72. In intermediate range a positive second gear ratio is engaged by the ratio engaging devices 84 and 107. In drive range, a freewheeling drive in second ratio is provided at low speeds by the ratio engaging device 107 and a split torque substantially direct drive is provided at high speeds by engaging ratio engaging device 121. In reverse range the reverse ratio is engaged by the ratio engaging device 142.

The hydraulic control system is supplied from a fluid sump, FIG. 2b, normally located in the lower portion of the transmission housing by line 161, filter 162 and pump supply line 163 to the front pump 58. The pump supply line 163 is connected through a one-way check valve 164 to rear pump 153. The front pump 58 supplies fluid to the front pump line 166 while the rear pump 153 supplies fluid to the rear pump line 167.

Push Start Valve

Whenever the engine is running to drive the front pump 58, the front pump pressure in line 166 moves the push start valve 168 (FIG. 2b) to the drive position connecting front pump line 166 to the main line 169 and rear pump line 167 to the governor line 171. When the engine is not running and the front pump is thus not supplying fluid, the push start valve 168 is in position shown in FIGURE 2b connecting the rear pump line 167 to the main line 169. The push start valve 168 has a valve element 173 having equal diameter lands $a$ and $b$ located in a bore 174 which is vented at the end adjacent land $a$ and closed at the end adjacent land $b$. A spring 175 located in one end of the bore acts on land $a$ of valve element 173 to urge the valve from the drive toward the push start position. With the valve in this position the rear pump line 167 is connected to the bore 174 adjacent land $a$ and communicates through the bore with the main line 169 which is connected to the bore adjacent land $b$. Thus, during a push start the rear pump supplies fluid via line 167 through the push start valve 168 to the main line 169. With the valve in the push start position governor line 171 is connected to exhaust through the vented bore 174 beyond land $a$. When the front pump supplies fluid via line 166 to the closed end of the bore 174 beyond land $b$ the fluid moves the valve against spring 175 to the drive position connecting the front pump line 166 to the main line 169 and connecting the rear pump line 167 between the lands $a$ and $b$ to the governor controlled line 171.

Rear Pump Super Charger Valve

The rear pump super charger valve 178 (FIG. 2b), when the engine is running, supplies fluid from the front pump at a pressure equal to the governor pressure in governor line 171 to super charge the rear pump 153 so that the inlet pressure and the outlet pressure are substantially equal and the outlet pressure is proportional to the speed of rotation of the rear pump to provide a governor pressure more accurately proportional to output shaft speed. The super charger valve 178 has the valve element 181 having lands $a$ and $b$ of equal diameter located in a bore 182 having a closed end beyond land $a$ connected to the rear pump supply line 165 and an open end adjacent land $b$ connected to the governor line 171 and having a stop 183 to limit movement of the valve 181. With valve 181 in the open position shown, the front pump line 166 is connected to bore 182 adjacent the land $a$ and through the bore to a branch of line 165 connected to the bore 182 adjacent land $b$. The valve element 181 is thus balanced between rear pump supply pressure from line 165 acting on land $a$ which tends to move valve element toward the closed position and governor pressure from line 171 acting on the end of land $b$ which tends to move the valve to the open position shown in FIGURE 2b in which the front pump supply line is connected to supply fluid to the rear pump supply line 165. When the pressure in the rear pump supply line 165 is equal to governor pressure or slightly exceeds governor pressure the valve element 181 will move and land $a$ will close the connection between front pump line 166 and rear pump supply line 165. When the governor pressure in line 171 exceeds rear pump supply pressure in line 165 the governor pressure will act on land $b$ and move the valve to the open position permitting additional supply of fluid from the front pump by line 166 to rear pump supply line 165.

Governor Valve

The governor valve 186 in FIGURE 2b connects the governor line 171 to a series of orifices to provide a stepped governor pressure (as shown in FIG. 3) proportional to output shaft speed in governor line 171 and rear pump line 167 when connected by the push start valve 168. The governor valve 186 has a valve element 187 located in a bore 188 and urged by spring 189 to the first stage position shown where the valve 187 abuts stop 183. Initially a branch of the governor line 171 is connected to orifice exhaust 191 to provide the first pressure rise stage proportional to output pump and shaft speed. When the governor pressure in line 171 reaches the first step the valve element 187 moves against the spring 189 to open the second orifice 192 to provide a pressure rise proportional to output shaft speed. At the end of the second stage or at the second step the valve element 187 will have moved sufficiently to open the third orifice 193 and the governor pressure will again level off and then rise proportional to increasing output shaft speed during the third governor stage. The spring chamber portion of bore 188 is provided with an exhaust 194 to prevent accumulation of fluid which would interfere with the operation of valve 187.

This arrangement provides a stepped pressure rise curve 190, as shown in FIG. 3 at full throttle in drive and intermediate ranges when the main line pressure varies in accordance with curve 234.

Since the main line pressure is reduced as explained below with decreasing throttle to the pressure curve 235 at closed throttle, and since valve 199 prevents the governor pressure from exceeding main line pressure the terminal portion of the governor curve 195 at closed throttle in drive and intermediate ranges is flat and coincides with main line pressure as shown in FIG. 3.

Main Regulator Valve

The main regulator valve 198 shown in FIGURE 2b controls the pressure in main line 169 at a regulated pressure which varies in accordance with throttle pedal position, governor pressure or output shaft speed and the drive range in which the transmission is operating as illustrated in the curve shown in FIG. 3. One-way check valve 199 permits flow only from the rear pump line 167 to the main line 169 to prevent rear pump or governor pressure exceeding the main line pressure. The regulator valve 198 has a valve element 201 having lands $a$, $b$ and $c$ of equal diameter located in a bore 202 and lands $d$ and $e$ having successively reduced diameters located in coaxially bore portions 204 and 205 having corresponding diameters. The valve element 201 is urged to the closed position by spring 207 abutting land $a$ and located in a spring chamber 208 coaxial with the bore 202 so that the land $e$ engages the closed end of bore 205. A sleeve element 211 located in the spring chamber 208 may provide a seat for the spring 207 and has a valve plug 212 located in a bore 213. Throttle line 215 supplies a pressure proportional to throttle pedal position as explained below to the bore 213 to act on the plug 212 to assist the spring 207 to raise the main line pressure with increasing throttle pedal position. Spring chamber 208 is provided with an exhaust 216. Main line 169 is connected through the valve between the lands $b$ and $c$ in all valve positions. The branch 217 of the main line 169 is connected through a one-way check valve 218 between the bore portions 204 and 205 to act on the unbalanced area between the lands $d$ and $e$. The line pressure from branch 217 acting on the unbalanced area between lands $d$ and $e$ tends to move the valve element 201 to the open position against spring 207. As the valve 201 moves toward the open position land $b$ first uncovers the port for the converter line 221 which is connected through an orifice 222 to the space between the ground sleeve 29 and the sleeve shaft 53 and a groove 223 in the hub 52 to the torque converter chamber. The outlet from the torque converter chamber passes through radial groove 224 in hub 56 and between the drive sleeve 57 and the ground sleeve 29 to outlet line 226 which is connected to the cooler 227. The cooler outlet line 228 in which pressure is regulated by the regulator valve 229 is connected at the rear of the transmission (FIG. 2a) to an axial lubricating passage 231 in shaft 69 having a plurality of branches connected to lubricate the transmission gearing. Regulator valve 198 first supplies fluid to main line 169 then supplies excess fluid to the converter line 221 and regulates the pressure in both of these lines when supplied at the same value. On an increase of pressure above the regulator valve, the land $a$ of valve element 201 will move out of the bore 202 and connect a branch of the front pump line 166 which is always connected to the bore 202 between the lands $a$ and $b$ through the bore 202 to the spring chamber 208 and exhaust 216 to directly vent the front pump without having fluid pass through the push start valve 168 or regulator valve 198. The intermediate and drive range line 219 which is supplied with fluid under pressure in intermediate and drive ranges as explained below is connected to the valve 198 between the bores 202 and 204 and acts on the unbalanced area between the lands $c$ and $d$ to reduce the regulated pressure during operation of the transmission in intermediate and drive ranges. The governor line 171 is connected to the end of bore 205 and acts on land $e$ to reduce the regulated main line pressure in steps inversely similar to the increasing governor pressure as illustrated in the curves 234 and 235 in FIG. 3 respectively for full and closed throttle in drive and intermediate ranges. In low range the main line pressure is increased but varies similarly with throttle and governor pressures.

Throttle Valve

The main line is connected to the throttle valve 236 (FIG. 2d) which provides a pressure in the throttle line 215 over a range of part throttle pedal positions substantially proportional to throttle pedal position and a pressure in detent line 237 substantially equal to main line pressure when the throttle pedal position is at the full throttle position or closely adjacent thereto in accordance with the operator's positioning of the throttle pedal. The throttle valve 236 includes a throttle regulator valve element 238 having a large land $a$ located in a large bore portion 241 and lands $b$ and $c$ located in bore 242, and a throttle detent valve element 243 having lands $a$ and $b$ of equal diameter located in bore 242 and a large land $c$ fitting into bore 244. The throttle valve 236 is actuated by a lever 246 which moves with the throttle pedal and acts on the end of the land $c$ to move the valve elements from the zero throttle pedal position illustrated in FIG. 2d into the bore. With increasing throttle opening the valve element 243 compresses spring 247 between the valve elements to increase the spring force acting on the regulator valve element 238 to tend to move the valve against the throttle pressure in bore 241 to open or connect main line 169 between the lands $b$ and $c$ to the throttle line 215 and close exhaust 248. Fluid is quickly supplied from throttle line 215 through the branch 251 having one-way check valve 252 to the closed end of the bore 241 to act on the land $a$ of valve element 238 to oppose the force exerted on valve element 238 by spring 247 due to the throttle pedal position. Further movement of the valve element 238 to the open position is retarded since the exhaust from the bore 241 must pass through the orifice branch 253 to the throttle line 215. The combination of the check valved passage 251 and the orificed passage 253 connecting the throttle line 215 to the bore 241 damps the action of the regulator valve element 238 and the regulated pressure in line 215. The exhaust 256 at the middle of land $b$ prevents excessive leakage of fluid between the bore 241 and the main line port 169. The exhaust 257 always exhausts the space between the valve elements 238 and 243 to prevent accumulation of fluid which would interfere with the valve action and in the closed throttle position shown exhausts the detent line 237. When the detent valve element 243 reaches substantially full throttle position the throttle line 215 is connected by branch 258 between the lands $a$ and $b$ of valve element 243 to the detent line 237 to supply substantially full line pressure to this line. If the high ratio clutch is engaged so that the transmission can be downshifted, the movement of the detent valve element 243 in the detent downshift or full throttle position is hydraulically resisted. Fluid at main line pressure in the high clutch line 303 is connected to the unbalanced area between the lands $b$ and $c$ of valve element 243 just after the land $c$ centers the bore 244 to provide a hydraulic force resisting movement of the valve element 243 to provide a signal to indicate to the operator by an increased resistance to movement of the throttle pedal that a detent downshift is being made. The shoulder 261 limits movement to the valve element 243 in the bore.

Manual Valve

The manual valve 266 connects the main line 169 in reverse range R to the reverse clutch line 271, in drive range DR to the drive range line 272, in intermediate range INT to intermediate clutch line 273, and in low range LO to the low clutch line 274. The valve 266 has an element 276 having lands $a$, $b$, $c$ and $d$ of equal diameter located in a bore 277. A series of annular grooves 278 located between the lands $b$ and $c$ cooperate with a detent 279 to resiliently position the valve in each of the range positions R, N, DR, INT and LO. The main line 169 is connected to the bore 277 between the lands $a$ and $b$ in all positions of valve element 276, and thus is continuously connected by ports 281 and a central bore 282 through the valve element 276 to the space between the lands $c$ and $d$. In the reverse position illustrated the space between the lands $c$ and $d$ is connected to the reverse line 271 to supply fluid to reverse ratio engaging device 142. Similarly moving the valve to the other range positions DR, INT and LO connects the space between the lands $c$ and $d$ to supply fluid respectively to drive range line 272, intermediate line 273 and low line 274. In neutral the space between the lands $c$ and $d$ is blocked. In all positions the lines not connected to the main line 169 by the space between the lands $c$ and $d$ are exhausted via exhaust 286 or 287 at the open end of the bore 277.

Drive Relay Valve

The drive relay valve 291 connects either the intermediate clutch line 273 or the drive range line 272 to the intermediate and drive range line 219 without interconnecting the intermediate clutch line and drive range line, so that in both intermediate and drive range positions of the manual selector valve, main line fluid is supplied to the intermediate and drive range line 219. The drive relay valve 291 has a valve element 292 located in a closed bore 293 and a spring 294 seated at one end of closed bore and engaging the valve element 292 to urge the valve to the position connecting the drive range line 272 to a branch 296 of the intermediate and drive range line 219. In this position valve element 292 blocks communication between the intermediate clutch line 273 and either intermediate and drive range line 219 or drive range line 272. When the manual valve is shifted to intermediate position main line fluid entering intermediate clutch line 273 enters the closed end of bore 293 and moves the valve element 292 to the intermediate position against the force of spring 294 connecting intermediate clutch line 273 to intermediate and drive range line 219 and blocks branch 296 so that the drive range line 272 cannot communicate with either line 219 or line 273.

*Intermediate High Shift Valve*

The intermediate high shift valve 298 controls the automatic upshift in drive range from intermediate ratio to high ratio in accordance with output shaft speed and throttle pedal position. The intermediate high shift valve 298 has a valve element 299 having lands $a$, $b$ and $c$ located in a stepped bore 301. Land $c$ has a larger diameter than land $b$ and is located in the larger portion of the stepped bore 301 to provide an unbalanced area acted on by the high clutch fluid for the hysteresis action which delays a downshift. The bore is closed at the end adjacent land $a$ and connected to the rear pump or governor line 167 so that governor pressure acts on the end of land $a$ to urge the valve from the intermediate to the high position. Alternatively the Pitot governor may supply the governor pressure through line 160. The space between the lands $a$ and $b$ is connected to the exhaust port 302 to prevent leakage past lands $a$ and $b$. With the valve element 299 in the intermediate position shown in FIG. 2c, the drive range line 272 is blocked by the land $c$ and pressure in the high clutch line 303 is connected between the lands $b$ and $c$ to exhaust 304. When the valve element 299 moves to the high ratio position the exhaust 304 is closed by the land $b$ and the drive range line 272 is connected between the lands $b$ and $c$ to the high clutch line 303. A part throttle downshift plug 307 is located in a reduced coaxial portion 308 of the bore 301 and acts on the free end of the land $c$ of valve element 299. A rear pump plug 311 is located in a separate bore 312 located coaxially with respect to the bores 308 and 301 and has a stem 314, projecting through an aperture in the wall 315 between the bores 312 and 308, engaging the plug 307. A spring 316 abutting the closed end of bore 312 and the vented end of the bore 312 engages the plug 311 to urge the downshift plug 307 and the valve element 299 to the intermediate position. The spring chamber end of bore 312 is vented by exhaust 317.

The spring 316 normally maintains all of the valve elements, the rear pump plug 311, the downshift plug 307 and the valve element 299 in the intermediate or downshift position. The spring and the valve areas are calibrated so that when the vehicle has reached a speed at which it is desired to provide zero throttle upshift the governor pressure in the line 167 acting on the plug 311 and on the land $a$ of valve element 299 will exert a sufficient force to upshift the valve against the force of spring 316 to the high ratio position. This type of shift will also occur at certain part throttle positions abnormally low in comparison to the vehicle speed. The throttle pressure line 215 is connected so fluid acts on the land $c$ of valve element 299 to move the valve toward the intermediate position against the governor pressure from line 167 acting on land $a$ at the other end and acts on the stem 314 of rear pump plug 311 to move the plug away from the plug 307. At certain part throttle positions with the vehicle under way at a speed in the normal range for a particular part throttle position, the throttle pressure acting on the stem 314 and the governor pressure acting on plug 311 is sufficient to move the rear pump plug 311 down against the force of springs 316 to a disabled position disengaging the spring 316 from the valve element 299 to condition valve 299 for rateless shifting. It will be appreciated that throttle pressure acts on both ends of the plug 307 and thus exerts no force on this plug. At this time the throttle pressure is sufficient to oppose the governor pressure and hold valve 299 in the downshift position. Thereafter with increasing speed the governor pressure acting on land $a$ will upshift the valve element 299 against the force of throttle pressure acting in the opposite direction on land $c$ as a rateless valve. Lands $b$ and $c$ have a small unbalanced area tending to hold the valve element in the upshift position to provide hysteresis. Also, after an upshift, land $c$ of valve element 299 closes the port of throttle valve line 215 to the space between land $c$ and part throttle downshift plug 307. Since throttle valve line 215 remains connected between plug 307 and stem 314, and part throttle downshift plug has less area than land $c$, there is a reduced throttle force on the valve 299 after upshift. At full throttle, line pressure supplied through the forced downshift line 237 enters the bore 301 between the plug 307 and the land $c$ of valve element 299 to move the valve to the downshift position against the governor pressure.

*Accumulator*

The intermediate drive range line 219 is connected to accumulator 321 which regulates the pressure of fluid supplied to the intermediate freewheel drive line 322 which is connected directly to supply fluid to the motor for the ratio engaging device for intermediate freewheel drive 107. The freewheel exhaust line 323 is blocked by a check valve 324 shown in FIG. 2a preventing flow to the freewheel drive ratio engaging device 107 and thus acts only as an exhaust passage when the exhaust control valve 341 is open as explained below. The accumulator 321 has a piston 326 located in a bore 327 and is urged by springs 328 toward the discharge end 329 of the bore. The intermediate drive range line 219 is connected through a check valve 331 to the discharge end 329 of accumulator bore 327 and to the freewheel line 322. The accumulator piston 326 has a projection valve actuator 332 which when the accumulator is in the empty position as shown in FIG. 2d holds the check valve 331 open for unrestricted flow from lines 219 to 322. As soon as the accumulator is partially charged the piston 326 is raised sufficiently so that the check valve 331 closes and further flow from line 219 to the accumulator and line 322 must pass through a small orifice 333 in the check valve 334 which is now closed. The flow then continues through a larger orifice 335 which does not control the flow to the accumulator bore 327 and line 322.

Throttle line 215 is connected to the closed end 337 of the accumulator to assist the springs to vary a pressure delivered by the accumulator in accordance with throttle pedal position. The intermediate drive ratio line 219 also has a branch 338 connected to the accumulator bore 327 at a point so that it is blocked unless the accumulator is in its substantially fully charged position. Thus, when the accumulator is fully charged an unrestricted connection is established between line 219 through branch 338 and the accumulator bore 327 to line 322. On exhaust during disengagement of the freewheel intermediate ratio engaging device, the exhaust will, when the exhaust control valve 341 is closed, flow through line 322 and during a first instant exhaust freely through branch line 338 and the intermediate drive range line 219 to exhaust. Then as the piston 326 closes the port to branch line 338 the check valve 331 will open at a low pressure so that the large orifice 335 controls the exhaust to line 219. When exhaust control valve 341 is open the exhaust via line 323 is controlled by orifice 351.

Exhaust Control Valve

The exhaust control valve 341 shown in FIG. 2a controls the exhaust from the freewheel intermediate ratio engaging device 107 in accordance with throttle pedal position and output speed. The exhaust control valve 341 has a valve element 342 having lands a, b and c located in a bore 343 having a small diameter portion 344 for land a and a large diameter portion 346 for lands b and c. A spring 347 abutting the shoulder between bore portions 344 and 346 engages the land b to urge the valve toward the closed end of bore 346. The governor line 167 is connected to the closed end of the bore 346 to act on the end of land c to move the valve against the force of spring 347. The throttle line 215 is connected to the closed end of bore 344 to act on the end of the land a to move the valve with the spring. The spring chamber portion of bore 346 is provided with an exhaust 348 adjacent bore portion 344. The valve element 342 is illustrated in the closed or low speed position with the land b blocking a branch of the freewheel drive range line 322 so that the exhaust from the ratio engaging device 107 flows only through the line 322 and not through line 323. At higher speeds varying upwardly with increasing throttle pedal position the valve element 342 will be moved against spring and freewheel intermediate line 322 will be connected between the lands b and c to the freewheel intermediate exhaust line 323 which passes through a small orifice 351 and through the one-way valve 324 to the line 219 at exhaust in parallel with the normal exhaust flow through line 322 and orifice 335 to provide a faster exhaust. If the valve 341 is open during engagement of the freewheel intermediate ratio engaging device 107 it will not be supplied through line 323 since the check valve 324 will prevent flow in this direction.

High Ratio Timing Valve

The high ratio timing valve 354 provides a fast fill of the high ratio fluid motor for the split torque ratio engaging device 121 during an initial low portion of the pressure rise, approximately sufficient to fill the fluid motor, and thereafter provide a slow fill to retard the pressure rise during engagement of the ratio engaging device. This timing valve 354 consists of a valve element 356 having lands a and b of equal diameter located in a bore 357. A spring 358 abutting one end of the valve bore having exhaust 359 engages the land a to move the valve element toward the fast fill position. In this position the high clutch line 303 is connected through a full flow branch 361 to the high motor line 362. High motor line is also connected to the closed end of bore 357 to act on the free end of land b of valve element 356 and at an intermediate pressure shortly after the high ratio engaging fluid motor device is filled and the pressure therein is just sufficient to initiate movement to move the valve element 356, against spring 358, to the restricted position in which land b blocks flow to the free branch 361 and only permits flow from line 303 through restricted orifice branch 363 to line 362 to supply the high ratio engaging device. The retraction springs for the high ratio engaging device have sufficient force to provide an exhaust pressure in line 362, during flow through the orifice 363, to provide sufficient pressure to hold the valve in the restricted position so that a slow exhaust is provided.

Operation

When the engine is started to drive the input member or engine shaft 14, the pump 58 supplies fluid at a pressure regulated by regulator valve 198 first to the main line 169 which supplies the gearing control system and then to the converter supply line 221 to fill torque converter to establish a drive. The orifice 222 in converter line 221 provides a controlled volume of flow to the converter, the cooler 227 and lubricating passages 231 for the transmission gearing. The manual valve 266 may then be shifted from neutral to the range positions indicated below to establish the ratios "X" as shown in the following table and described below.

| Manual valve position | Gear ratio | Ratio devices | | | | |
|---|---|---|---|---|---|---|
| | | 121, split torque drive | 107, freewheel int. | 84, direct int. | 72, low | 142, rev. |
| LO | First | | | | X | |
| INT | Second | | X | X | | |
| DR | Freewheel int | | X | X | | |
| DR | Split torque dr | X | X | | | |
| N | Neutral | | | | | |
| R | Reverse | | | | | X |

Low Range Operation

In low range the manual selector valve 266 is moved to the LO or low range position indicated in FIG. 2c in which the main line 169 having the regulated pressure is connected to the low clutch or range line 274 which supplies fluid to the low ratio engaging device 72 for manual control of low ratio. The other range lines are then connected to exhaust 286 or 287.

Intermediate Range Operation

In intermediate ratio the manual selector valve is moved to the INT or intermediate range position in which the main line 169 is connected to the intermediate clutch or range line 273 which supplies fluid to the direct drive intermediate ratio engaging device 84 for a two-way drive. The intermediate clutch line 273 is also connected to the relay valve 291 and moves the valve element 292 down against the spring 294, connecting the intermediate clutch line 273 to the intermediate drive range line 219.

The line 219 is connected through the accumulator 321 and associated orifices to intermediate freewheel drive line 322 to cushion the engagement of the freewheeling ratio device 107 during a low to high range shift as fully explained below. Since the engagement of the freewheeling intermediate ratio engaging device 107 does not effect the operation of the gearing on a shift from low to intermediate range because the direct drive intermediate ratio engaging device 84 is first engaged by unrestricted flow through line 273, this cushioning has no effect on this shift.

However, on a shift from intermediate to low range the manual selector valve 266 will be moved to the LO position venting line 273 at the manual selector valve. The unrestricted vent through the intermediate range line 273 will first disengage the direct drive intermediate ratio engaging device 84. The disengagement of the freewheeling intermediate ratio engaging device 107 through the line 322 and orifice 335 at accumulator 321 to line 219 and range line 272 will be delayed since the accumulator 321 will maintain the pressure sufficient to hold the intermediate ratio device 107 lightly engaged. This slow exhaust will provide overlap for the intermediate to low range shift. Since this shift is usually made at low speeds the exhaust control valve 341 will be closed further delaying the shift.

Drive Range Operation

In drive range an automatic shift is provided between intermediate freewheel drive and split torque high ratio drive. When the manual selector valve 266 is moved to the drive range position mainline 169 will be connected ot the drive range line 272 supplying the intermediate high shift valve 298 which would normally be in the downshift position shown, blocking line 272. Line 272 is also connected through the relay valve 291 to the intermediate drive range line 219.

On a shift from intermediate range to drive range the freewheel intermediate ratio device 107 will remain engaged as intermediate clutch line 273 is disconnected and drive range line 272 connected by drive relay valve 291 to intermediate drive range line 219. Valve 291 changes these connections quickly without any appreciable loss of pressure in ratio device 107 and any loss of pressure would be counteracted by the accumulator 321.

Since the freewheeling intermediate ratio engaging device 107 is not engaged in low ratio, it will be engaged on a shift from low to drive range to pick up the drive during engagement. This engagement is cushioned by the accumulator and associated orifices.

When the manual valve 266 is moved from low range to drive range the low ratio device 72 is disengaged by exhausting low clutch line 274 at exhaust 287 and connecting main line 169 to drive range line 272. Drive range line 272 is connected to the intermediate high shift valve 298 which in the low speed position shown blocks the flow and is connected to the drive relay valve 291 which connects this line to the intermediate drive range line 219. This line 219 is connected through the accumulator 321 and orifices to the intermediate freewheel drive line 322 to cushion the engagement of the intermediate freewheel device 107. Initially while the projection 332 on the accumulator piston 326 holds the check valve 331 open, an unrestricted connection is provided from line 219 through valve 331 and line 322 to quickly fill the freewheeling intermediate ratio engaging device 107. At a predetermined low pressure sufficient to initiate engaging movement of intermediate ratio device 107 the accumulator piston 326 rises so that the projection 332 permits the check valve 331 to close. Thereafter flow continues through the small orifice 333 to fill the accumulator slowly to complete the engagement of the ratio engaging device 107 at a very slow rate with a slower pressure rise. After this ratio engaging device 107 is fully engaged the accumulator will be raised to permit unrestricted connection between branch 338 of intermediate drive range line 219 to the accumulator bore 327 and line 322.

When the transmission is operating in drive range an increase in speed or a decrease in throttle position may shift the intermediate high valve 298 to place the transmission in split torque high ratio. As explained above the valve element 299 of shift valve 298 will upshift at a certain speed under closed throttle conditions against the spring 316 and the spring under certain part throttle or high speed conditions will be disengaged from the valve so that the upshift due to the opposing governor and throttle forces will be rateless since the spring does not act on the valve element 299. When the valve upshifts the drive range line 272 will be connected between the lands b and c to the high clutch line 303.

The rate of engagement of the split torque high ratio engaging device 121 will be controlled by the high ratio timing valve 354 as explained above to cushion the shift. After a high throttle downshift due to a reduction in speed or a detent downshift line 272 would again be blocked by land c and the high ratio line 303 connected to exhaust 304. This exhaust as explained above is controlled by the timing valve 354.

On a downshift from drive range to low range with the transmission operating in high ratio, the high clutch will be exhausted via line 272 and the manual valve. The freewheeling intermediate ratio engaging device 107 and accumulator 321 will be exhausted through line 322 and orifice 335 or at higher speeds also through exhaust control valve 341 and smaller orifice 351 and then in either case through line 219, relay valve 291 and line 272 to the exhaust at the manual control valve 266. The disengagement of the intermediate freewheel device 107 will be delayed due to the additional fluid supplied by the accumulator 321, the restriction of the orifices and due to the fact that the exhaust must flow through line 272 carrying the high clutch exhaust. Thus, on a shift from drive range to low range the transmission if operating in high ratio will be downshifted to the freewheeling intermediate ratio and then to low ratio.

On a shift from drive range to intermediate range, the drive range line 272 is exhausted at the manual valve. If the transmission was in high ratio, the device 121 would be exhausted via line 362, timing valve 354, high clutch line 303 and line 272. The intermediate clutch line 273 would be supplied at the manual valve to engage the intermediate direct drive device 84, and actuate relay valve 291 to supply line 219 to continue the engagement of the freewheeling intermediate ratio device 107.

*Reverse Range Operation*

For reverse drive the manual valve 266 is moved to the R or reverse position connecting the main line 169 to reverse line 271, the other range lines being connected to exhaust 287.

The above described preferred embodiment is illustrative of the invention which may be modified within the scope of the appended claims.

We claim:

1. In an automatic transmission; an input member; an output member; drive means including a first drive providing two-way torque transmission having first fluid operated means operative for engaging said first drive, a second drive providing only one-way torque transmission having second fluid operated means operative for engaging said second drive, and a third drive providing torque transmission having fluid operated means operative for engaging said third drive; each of said drives connecting said input member to said output member to drive said output member in the same direction; said first and second drives having the same speed ratio and said third drive having a higher speed ratio; a source of fluid under pressure; valve means for connecting said source to said first and second fluid operated means to engage and disengage said first and second drives and being operative in a first position for controlling the supply of fluid to said first and second fluid operated means for disengaging said first and second drives and being operative in a second position for controlling the supply of fluid to said first and second fluid operated means for engaging said first drive and including time delay means operative for controlling the supply of fluid to said second fluid operated means for engaging said second drive a predetermined time after engagement of said first drive and being operative in a third position for controlling the supply of fluid to said first and second fluid actuated means to disengage said first drive and to engage said second drive; and means for controlling the supply of fluid to said third drive for engaging and disengaging said third drive operative only when said valve means is in said third position to control the supply of fluid to said third fluid operated means to engage said third drive.

2. The invention defined in claim 1 and a regulator valve to regulate the pressure of said source and means operative on movement of said valve means to said second position to reduce the pressure regulated by said regulator valve prior to establishment of said second drive.

3. In an automatic transmission; an input member; an output member; drive means including a first drive providing two-way torque transmission having first fluid operated means operative for engaging said first drive, a second drive providing only one-way torque transmission having second fluid operated means operative for engaging said second drive and a third drive providing two-way torque transmission having fluid operated means operative for engaging said third drive; each of said drives connecting said input member to said output member to drive said output member in the same direction; said first and second drives having the same speed ratio and said third drive having a higher speed ratio; a source of fluid under pressure; control means including valve means for connecting said source to said first and second fluid operated means operative in a first position for exhausting said first and second fluid operated means to disengage said first and second drives and movable to a second position for operation for supplying fluid to said first fluid operated means to engage said first drive and including time delay means operative for delaying the supply of fluid to said second fluid operated means to engage said second drive a predetermined time after engagement of said first drive, and being operative in a third position for exhausting said first fluid actuated means to disengage said first drive and for supplying fluid to said second fluid actuated means to engage said second drive; and means operative only when said valve means is in said third position for controlling the supply of fluid to said third fluid operated means to engage said third drive.

4. The invention defined in claim 3 and said control means also including orifice means controlling the supply of fluid from said source to said second drive fluid operated means to provide a restricted passage during at least a portion of the pressure rise in said second drive fluid operated means during establishment of said second drive.

5. The invention defined in claim 3 and said control means including means to control the exhaust of said second freewheel drive device on disestablishment to increase the rate of exhaust of fluid at higher transmission speeds.

6. The invention defined in claim 3 and said control means including an accumulator connected to said second drive fluid operated means and variable orifice means controlling the supply of fluid from said source to said second drive fluid operated means controlled by said accumulator.

7. In an automatic transmission; an input member; an output member; drive means including a first drive providing two-way torque transmission having first fluid operated means operative for engaging said first drive, a second drive providing only one-way torque transmission having second fluid operated means operative for engaging said second drive, and a third drive providing two-way torque transmission having fluid operated means operative for engaging said third drive; each of said drives connecting said input member to said output member to drive said output member in the same direction; said first and second drives having the same speed ratio and said third drive having a higher speed ratio; a source of fluid under pressure; and valve means for connecting said source to said first, second and third fluid operated means to engage and disengage said first, second and third drives and being operative in a first position for controlling the supply of fluid for said first, second and third fluid operated means for disengaging said first, second and third drives and being operative in a second position for controlling the supply of fluid for said first, second and third fluid operated means for engaging said first drive and including time delay means operative to control the supply of fluid for said second fluid operated means to engage said second drive a predetermined time delay after engagement of said first drive, and for controlling the supply of fluid for said third drive to disengage said third drive, being operative in a third position to control the supply of fluid for said first, second and third fluid actuated means to disengage said first and third drives and to engage said second drive, and being operative in a fourth position to control the supply of fluid for said first, second and third fluid operated means to disengage said first drive and to engage said second and third drives.

8. In an automatic transmission; an input member; an output member; drive means including a first drive providing two-way torque transmission having first fluid operated means operative for engaging said first drive, a second drive providing two-way torque transmission having second fluid operated means operative for engaging said second drive, and a third drive providing only one-way torque transmission having fluid operated means operative for engaging said third drive; each of said drives connecting said input member to said output member to drive said output member in the same direction, said first drive having a low speed ratio; said second and third drives having the same higher speed ratio; a source of fluid under pressure; valve means for connecting said source to said first, second and third fluid operated means operative in a first position for controlling the supply of fluid to said first, second and third fluid operated means to engage said first drive and to disengage said second and third drives and operative in a second position for controlling the supply of fluid to said first, second and third fluid operated means to disengage said first drive, to engage said second and third drives and including delay means for controlling the supply of fluid to said third fluid operated means to engage said third drive a predetermined time after engagement of said second drive.

9. The invention defined in claim 8 and said valve means being operative on movement from said second position to said first position for first controlling the supply of fluid for said first and second fluid operated means to disengage said second drive and engage said first drive and including delay means operative after a predetermined time delay to control the supply of fluid to said third fluid operated means to disengage said third drive to provide overlap.

10. In an automatic transmission; an input member; an output member; drive means including a first drive providing two-way torque transmission having first fluid operated means operative for engaging said first drive, a second drive providing two-way torque transmission having second fluid operated means operative for engaging said second drive, and a third drive providing only one-way torque transmission having fluid operated means operative for engaging said third drive; each of said drives connecting said input member to said output member to drive said output member in the same direction, said first drive having a low speed ratio, said second and third drives having the same higher speed ratio; a source of fluid under pressure; valve means connecting said source to said first, second and third fluid operated means operative in a first position for controlling the supply of fluid to said first, second and third fluid operated means to engage said first drive and disengage said second and third drives and in a second position operative for controlling the supply of fluid to said first, second and third fluid operated means to engage said second and third drive and to disengage said first drive and operative on movement from said second position to said first position to first control the supply of fluid to said first, second and third fluid operated means to disengage said second and third drives and to engage said first drive and including time delay means for delaying disengagement of said third drive a predetermined time after disengagement of said second drive to provide overlap.

11. In an automatic transmission; an input member; an output member; drive means including a first drive providing two-way torque transmission having first fluid operated means operative for engaging said first drive, a second drive providing two-way torque transmission having second fluid operated means operative for engaging said second drive, a third drive providing only one-way torque transmission having fluid operated means operative for engaging said third drive and a fourth drive providing two-way torque transmission having fourth fluid operated means operative for engaging said fourth drive, each of said drives connecting said input member to said output member to drive said output member in the same direction, said first drive having a low speed ratio, said second and third drives having the same higher speed ratio; said fourth drive having a still higher speed ratio; a source of fluid under pressure, and valve means for connecting said source to said first, second and third fluid operated means operative in a first position for controlling the supply of fluid to said first, second and third fluid operated means to engage said first drive and disengage said second and third drives, and in a second position for controlling the supply of fluid to said first, second and third fluid operated means to disengage said first drive and to engage said second and third drives and including delay means operative for controlling the supply of fluid to said third fluid operated means to engage said third drive after a predetermined time delay and movable to a third position for controlling the supply of fluid to said first, second and third fluid operated means to disengage said first and second drives and to engage said third drive and means operative only when said manual valve means is in said third position for controlling the supply of fluid to said fourth fluid operated means to engage said fourth drive.

12. In an automatic transmission; an input member; an output member; drive means including a first drive providing two-way torque transmission having first fluid operated means operative for engaging said first drive, a second drive providing two-way torque transmission having second fluid operated means operative for engaging said second drive, a third drive providing only one-way torque transmission having fluid operated means operative for engaging said third drive and a fourth drive providing two-way torque transmission having fourth fluid operated means operative for engaging said fourth drive, each of said drives connecting said input member to said output member to drive said output member in the same direction, said first drive having a low speed ratio, said second and third drives having the same higher speed ratio; said fourth drive having a still higher speed ratio; a source of fluid under pressure, and valve means for connecting said source selectively to each of said fluid operated means operative in a first position for controlling the supply of fluid to each of said fluid operated means to engage said first drive and disengage said second, third and fourth drives and in a second position for controlling the supply of fluid to each of said fluid operated means to disengage said first and fourth drives and to engage said second and third drives and including delay means operative for controlling the supply of fluid for said third fluid operated means to engage said third drive after a predetermined time delay and movable to a third position for controlling the supply of fluid to each of said fluid operated means to disengage said first, second and fourth drives and to engage said third drive and means operative in a fourth position to control the supply of fluid to each of said fluid operated means to disengage said first and second drives and to engage said third and fourth drives.

13. In an automatic transmission; an input member; an output member; drive means including a first drive providing two-way torque transmission having first fluid operated means operative for engaging said first drive, a second drive providing two-way torque transmission having second fluid operated means operative for engaging said second drive, and a third drive providing only one-way torque transmission having fluid operated means operative for engaging said third drive; each of said drives connecting said input member to said output member to drive said output member in the same direction, said first drive having a low speed ratio; said second and third drives having the same higher speed ratio; a source of fluid under pressure; valve means connecting said source to said first, second and third fluid operated means operative in a first position for controlling the supply of fluid to said first, second and third fluid operated means to engage said first drive and to disengage said second and third drives and operative in a second position for controlling the supply of fluid to said first, second and third fluid operated means to disengage said first drive, to engage said second and third drives and including timing means for timing the engagement of said second and third drives in a spaced time sequence.

14. In an automatic transmission; an input member; an output member; drive means including a first drive providing two-way torque transmission having first fluid operated means operative for engaging said first drive, a second drive providing two-way torque transmission having second fluid operated means operative for engaging said second drive, and a third drive providing only one-way torque transmission having fluid operated means operative for engaging said third drive; each of said drives connecting said input member to said output member to drive said output member in the same direction, said first drive having a low speed ratio, said second and third drives having the same higher speed ratio; a source of fluid under pressure; valve means connecting said source to said first, second and third fluid operated means operative in a first position for controlling the supply of fluid to said first, second and third fluid operated means to engage said first drive and disengage said second and third drives and in a second position operative for controlling the supply of fluid to said first, second and third fluid operated means to engage said second and third drive and to disengage said first drive and operative on movement from said second position to said first position to first control the supply of fluid to said first, second and third fluid operated means to engage said first drive and to disengage said second and third drives and including timing means for timing the disengagement of said second and third drives in a spaced time sequence to provide overlap during engagement of said first drive.

15. In a transmission, input means, output means, fluid operated means connecting said input and output means to establish a driving connection between said input and output means, a source of fluid under pressure, means connecting said source to said fluid operated means for establishing flow and releasing flow to operate said fluid operated means including a passage having a restricting orifice operative during at least a portion of said establishing and releasing flow, and a one-way bypass passage permitting only releasing flow connected in parallel to said restricting orifice to provide additional releasing flow capacity to increase the rate of release of said fluid operated means, and valve means controlling said bypass passage normally biased to a closed position and responsive to the speed of said output member to open said valve means permitting flow through said bypass passage at predetermined speeds.

16. In a transmission, an input member, an output member, fluid operated means to establish a driving connection between said input and output members, a source of fluid under pressure, supply means to supply fluid from said source to said fluid operated means including a restricted and unrestricted passage located in parallel to each other through which the fluid flows from said source to said fluid operated means, valve means in said unrestricted passage biased to a closed position to control the fluid flow to said fluid operated means to control the fluid pressure in said fluid operated means, an accumulator consisting of a cylinder having a piston therein, biasing means biasing said piston in one direction, means connecting said controlled fluid pressure in said fluid operated means to said cylinder to actuate said piston in opposition to said biasing means, and means operatively connected to said piston to control said valve means.

17. The invention defined in claim 16 and said biasing means including means to vary the biasing force at the will of the operator.

18. In a transmission, an input member, an output member, fluid operated means to establish a driving connection between said input and output members, a source of fluid under pressure, supply means to supply fluid from said source to said fluid operated means including a restricted and an unrestricted passage located in parallel to each other through which the fluid flows from said source to said fluid operated means, valve means in said unrestricted passage biased to a closed position and movable to an open position to control the fluid flow to said fluid operated means to control the fluid pressure in said fluid operated means, an accumulator consisting of a cylinder having a piston therein, biasing means biasing said piston in one direction, means connecting said controlled fluid pressure in said fluid operated means to said cylinder to actuate said piston in opposition to said biasing means, and valve actuator means operatively connected to said piston and engages the valve means only during a predetermined range of movement to hold said valve means in said unrestricted passage in said open position during a predetermined range of movement of said piston.

19. In a transmission for a drive mechanism having an engine, control means responsive to the torque demand on an engine, an input member driven by the engine, an output member, fluid operated means to establish a driving connection between said input and output members, a source of fluid under pressure, supply means to supply fluid from said source to said fluid operated means including a restricted and unrestricted passage located in parallel to each other through which the fluid flows from said source to said fluid operated means, valve means in one of said passages biased to a closed position and movable to an open position to control the fluid flow to said fluid operated means to control the fluid pressure in said fluid operated means, an accumulator consisting of a cylinder having a piston therein, biasing means including means operative in response to said control means to vary the biasing force in response to the torque demand on said engine to bias said piston in one direction, means connecting said controlled fluid pressure in said fluid operated means to said cylinder to actuate said piston in opposition to said biasing means, and means operatively connected to said piston to control said valve means.

20. In a transmission, input means, output means, fluid operated means connecting said input and output means to establish a driving connection between said input and output means, a source of fluid under pressure, supply means connecting said source to said fluid operated means for establishing flow and releasing flow to operate said fluid operated means including a first passage having a restricted orifice operative during one portion of said establishing and releasing flow and an unrestricted passage operative during another portion of said releasing flow, a one-way bypass passage permitting only releasing flow connected in parallel to said orifice to provide additional releasing flow capacity to increase the rate of release of said fluid operated means, valve means controlling said bypass passage normally biased to a closed position and responsive to the speed of said output member to open said valve means permitting flow through said bypass passage, and means responsive to the pressure in said fluid operated means to render said restricted or unrestricted passage in said first passage operative.

21. In a transmission for a drive mechanism having an engine, control means responsive to the torque demand of an engine, input means driven by an engine, output means, fluid operated means connecting said input and output means to establish a driving connection between said input and output means, a source of fluid under pressure, means connecting said source to said fluid operated means for establishing flow and releasing flow to operate said fluid operated means including a restricted orifice operative during at least a portion of said establishing and releasing flow, a one-way bypass passage connected in parallel to said orifice to provide additional release flow capacity to increase the rate of release of said fluid operated means, and valve means controlling said bypass passage normally biased proportional to the torque demand by said control means to a closed position and movable responsive to high speed of said output member to open said valve means permitting flow through said bypass passage.

22. In a transmission for a drive mechanism including an engine, control means responsive to the torque demand on the engine, an input member adapted to be driven by the engine, an output member, a fluid operated device to establish a driving connection between said input and output members, a source of fluid under pressure, a torque demand means movable by said control means to provide a torque demand pressure proportional to the torque demand on said engine, governor means providing a governor pressure proportional to the speed of one of said members, means including a shift valve including a first element connecting said fluid operated device to exhaust in a first position and connecting said source to said fluid operated device in a second position, a second element, said first and second elements being coaxially located in a first bore closed at both ends, a third element located in an independent coaxial second bore having a portion projecting into said first bore and engaging said second valve element, biasing means in said second bore biasing said third valve element portion into engagement with said second valve element to bias said valve elements in one direction, said governor pressure being connected to said first bore to urge said first valve element in the opposite direction and to said second bore to urge said third valve element in said opposite direction, said torque demand pressure being connected to said first bore between said first and second valve elements in said first position of said first valve element and disconnected in said second position of said first valve element and being connected between said second valve element and said projection on said third valve element to under partial torque demand conditions hold said first valve element in said first position against said governor pressure and to assist said governor pressure to move said third valve element against said spring away from said first valve element to provide rateless operation of said first valve element on the shift from said first to said second position.

23. In an automatic transmission, an input member, an output member, a low and a high ratio control device to establish a low and high drive ratio between said input and output members, detent means to provide a force at the will of the operator, governor means providing a governor force proportional to the speed of said transmission, automatic control means responsive to said governor force to selectively establish said low and high ratio control device to establish said low or high ratio, said detent means being operatively connected to said automatic control means to position said automatic control means in said low ratio position, and means responsive to the establishment of said high ratio control device acting on said detent means to signal the operator so that the operator will be informed when operation of the detent means is effective to downshift the transmission.

24. In an automatic transmission for a drive mechanism having an engine, torque control means responsive to the torque demand on the engine, an input member adapted to be driven by the engine, an output member, a low and a high ratio fluid operated device to establish a low and a high drive ratio between said input and output members, a source of fluid under pressure, torque means operable in response to said torque control means to provide a torque pressure proportional to the torque demand, detent means to provide a pressure at the will of the operator higher than said torque pressure, governor means providing a governor pressure proportional to the speed of said transmission, automatic control means responsive to said governor pressure and said torque pressure to selectively connect said source to said low and high fluid operated ratio device to establish said low or a high ratio, said detent means being operatively connected to said automatic control means to position said automatic control means in said low ratio position, and means responsive to the pressure in said high ratio fluid operated device acting on said detent means to signal the operator so that the operator will be informed when operation of the detent means is effective to downshift the transmission.

25. In a control mechanism for a hydraulically operated transmission; a supply line; first control means; a source of fluid under pressure; a first signal means movable by said first control means to provide a first signal pressure proportional to a function of said first control means, second control means, a second signal means providing a second signal pressure proportional to a function of said second control means; means including a shift valve including a first element connecting said supply line to exhaust in a first position and conecting said source to said supply line in a second position, a second element, said first and second elements being coaxially located in a first bore closed at both ends, a third element located in an independent coaxial second bore having a portion projecting into said first bore and engaging said second valve element, biasing means in said second bore biasing said third valve element portion into engagement with said second valve element to bias said valve elements in one direction, said second signal pressure being connected to said first bore to urge said first valve element in the opposite direction and to said second bore to urge said third valve element in said opposite direction, said first signal pressure being connected to said first bore between said first and second valve elements in said first position of said first valve element and disconnected in said second position of said first valve element and being connected between said second valve element and said projection on said third valve element to under partial first signal conditions hold said first valve element in said first position against said second signal pressure and to assist said second signal pressure to move said third valve element against said spring away from said first valve element to provide rateless operation of said first valve element on the shift from said first to said second position.

26. In a governor control system for a transmission; first control means; a fluid operated device; a source of fluid under pressure, first signal means movable by said first control means to provide a first signal pressure proportional to a function of said first control means; governor means providing a governor pressure proportional to speed, means including a shift valve including a first element connecting said fluid operated device to exhaust in a first position and connecting said source to said fluid operated device in a second position, a second element, said first and second elements being coaxially located in a first bore closed at both ends, a third element located in an independent coaxial second bore having a portion projecting into said first bore and engaging said second valve element, biasing means in said second bore biasing said third valve element portion into engagement with said second valve element to bias said valve elements in one direction, said governor pressure being connected to said first bore to urge said first valve element in the opposite direction and to said second bore to urge said third valve element in said opposite direction, said first signal pressure being connected to said first bore between said first and second valve elements in said first position of said first valve element and disconnected in said second position of said first valve element and being connected between said second valve element and said projection on said third valve element to under partial first signal conditions hold said first valve element in said first position against said governor pressure and to assist said governor pressure to move said third valve elements against said spring away from said first valve element to provide rateless operation of said first valve element on the shift from said first to said second position.

27. In a transmission for a drive mechanism including an engine, control means responsive to the torque demand on the engine, an input member adapted to be driven by the engine, an output member, a fluid operated device to establish a driving connection between said input and output members, a final drive member driven by said output member, a source of fluid under pressure, a torque demand means movable by said control means to provide a torque demand pressure proportional to the torque demand on said engine, governor means including governor fluid supply means providing a governor pressure proportional to the speed of one of said final drive members, means including a shift valve including a first element connecting said fluid operated device to exhaust in a first position and connecting said source to said fluid operated device in a second position, a second element, said first and second elements being coaxially located in a first bore closed at both ends, a third element located in an independent coaxial second bore having a portion projecting into said first bore and engaging said second valve element, biasing means in said second bore biasing said third valve element portion into engagement with said second valve element to bias said valve elements in one direction, means connecting said governor means to urge said first valve element in the opposite direction, and means connecting said governor fluid supply means to said second bore to supply governor pressure to urge said third valve element in said opposite direction, said torque demand pressure being connected to said first bore between said first and second valve elements in said first position of said first valve element and disconnected in said second position of said first valve element and being connected between said second valve element and said projection on said third valve element to under partial torque demand conditions hold said first valve element in said first position against said governor means and to assist said governor pressure supplied by said governor fluid supply means to move said third valve elements against said spring away from said first valve element to provide rateless operation of said first valve element on the shift from said first to said second position.

28. In a transmission, drive means providing a low and a high ratio drive, control means operatively connected to said drive means to selectively establish said low and high ratio drive, operator controlled means including an operator controlled valve element operatively connected to said control means and actuable to control said control means to insure operation of said drive means in said low ratio, and means connected to said control means and operator controlled means providing a fluid pressure acting directly on said operator control valve element only when said drive means is in high ratio to signal the operator only when said operator controlled means is effective to downshift the transmission.

29. In a transmission; input means; output means; fluid operated drive means connecting said input and output means to establish a driving connection between said input and output means; a source of fluid under pressure; shift valve means including first conduit means connecting said source to said shift valve and second conduit means connecting said shift valve to said fluid operated means; said shift valve being operative in one position to connect said source through said first conduit means, shift valve and second conduit means to said fluid operated means and in another position to connect said fluid operated means through said second conduit means and shift valve to exhaust; said second conduit means connecting said shift valve to said fluid operated means for establishing flow and releasing flow to operate said fluid operated means including a first passage having a restricting orifice operative during at least a portion of both said establishing and releasing flow, and a one-way bypass passage permitting only releasing flow connected in parallel to said restricting orifice to provide additional releasing flow capacity to increase the rate of release of said fluid operated means, and means to selectively block said one-way bypass passage during releasing flow through said first passage to selectively control the rate of releasing flow.

30. The invention defined in claim 29, and said means to block said one-way bypass passage being operative to block said releasing flow at low transmission speeds.

References Cited in the file of this patent

UNITED STATES PATENTS

| | | |
|---|---|---|
| 2,592,538 | Burtnett | Apr. 15, 1952 |
| 2,595,969 | McFarland | May 6, 1952 |
| 2,606,456 | Dodge | Aug. 12, 1952 |
| 2,624,215 | McRae | Jan. 6, 1953 |
| 2,643,613 | Westbury et al. | June 30, 1953 |
| 2,691,940 | McFarland | Oct. 19, 1954 |
| 2,693,711 | Kelbel et al. | Nov. 9, 1954 |
| 2,751,182 | Snyder | June 19, 1956 |
| 2,756,851 | Collins | July 31, 1956 |
| 2,766,639 | Rosenberger | Oct. 16, 1956 |
| 2,788,678 | Sheppard | Apr. 16, 1957 |
| 2,792,716 | Christenson | May 21, 1957 |
| 2,807,968 | Foster | Oct. 1, 1957 |
| 2,818,708 | Kelley | Jan. 7, 1958 |
| 2,873,618 | De Lorean | Feb. 17, 1959 |
| 2,895,344 | Holdeman et al. | July 21, 1959 |
| 2,919,597 | Borman | Jan. 5, 1960 |